United States Patent [19]

Brashears

[11] Patent Number: 4,671,688

[45] Date of Patent: Jun. 9, 1987

[54] SHIELDED KEYBOARD

[75] Inventor: David W. Brashears, Annapolis, Md.

[73] Assignee: Honeywell Inc., Minneapolis, Minn.

[21] Appl. No.: 782,825

[22] Filed: Oct. 2, 1985

[51] Int. Cl.⁴ .......................... B41J 29/00; G06C 7/02
[52] U.S. Cl. .................................... 400/714; 400/472;
235/145 R; 340/365 R
[58] Field of Search ............... 400/480, 481, 491, 714,
400/472, 473; 235/145 R, 146; 340/365 R

[56] References Cited

U.S. PATENT DOCUMENTS

| | | | |
|---|---|---|---|
| 3,627,927 | 12/1971 | Schmitz et al. | 400/491 X |
| 3,693,775 | 9/1972 | Brooks et al. | 400/480 X |
| 3,964,594 | 6/1976 | Gabbrielli et al. | 400/491 X |
| 4,119,839 | 10/1978 | Beckmann et al. | 400/473 X |

FOREIGN PATENT DOCUMENTS

| | | | |
|---|---|---|---|
| 74315 | 3/1983 | European Pat. Off. | 400/491 |
| 3042579 | 5/1982 | Fed. Rep. of Germany | 400/491 |
| 1443174 | 7/1976 | United Kingdom | 400/491 |

OTHER PUBLICATIONS

IBM Tech. Disc. Bulletin, "Keyboard", Dicks, vol. 12, No. 7, Dec. 1979, p. 982.
IBM Tech. Disc. Bulletin, "Provision of Movement and Sound in Capacitance Switch and Diaphragm Switch Keybords", Mitchell et al., vol. 24, No. 5, Oct. 1981, pp. 2422-2423.

Primary Examiner—Edgar S. Burr
Assistant Examiner—James R. McDaniel
Attorney, Agent, or Firm—Roger W. Jensen

[57] ABSTRACT

A shielded keyboard comprising a sheet of flexible fine wire mesh material between an array of keyboard contacts and an apposed array of switching actuators.

1 Claim, 3 Drawing Figures

SHIELDED KEYBOARD

FIELD OF THE INVENTION

This invention relates to the field of electrical engineering, and particularly to the design of keyboards of electronic equipment such as computers, accounting machines, postage meters, and so forth to ensure security during keyboard operation.

It is well known that operation of electrical equipment is often accompanied by emission of electromagnetic radiations having characteristics such that they are capable of being detected and interpreted at sites remote from the equipment. In government and industrial security applications remote detection of these radiations may compromise the secrecy of an operation, and may present a serious problem where the national security is at stake.

It is also known to minimize the radiation of remotely detectable signals by enclosing the equipment in a shielding container. However, a problem remains when the operation of a system involves manipulation of switches, as in keyboard operation. Not only is on-off operation or circuit interruption a prime source of the undesirable signals, but the need for mechanical movement to cause switch or other operation requires a panel or switchboard area having actuator apertures, through which radiation can easily escape.

I have discovered that this undesirable effect can be overcome by the use of a properly positioned layer of thin, highly flexible woven mesh of stainless steel or Monel metal wire, without requiring close tolerance manufacturing and installing procedures, and without affecting any human engineering aspects such as the height of the keypads of the "feel" of key operation.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
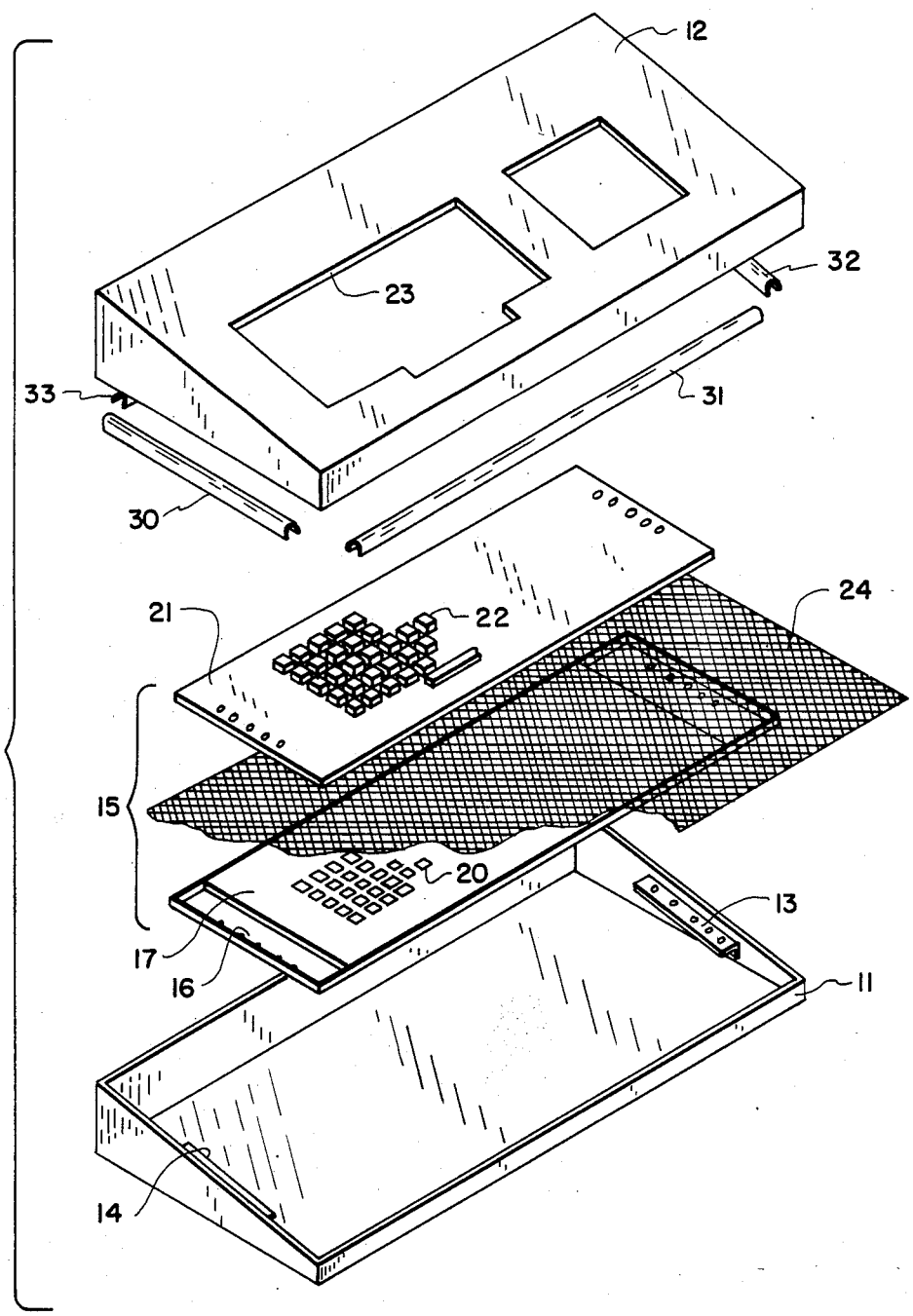
FIG. 1 is an exploded view of a keyboard according to the invention.
Figure 2:
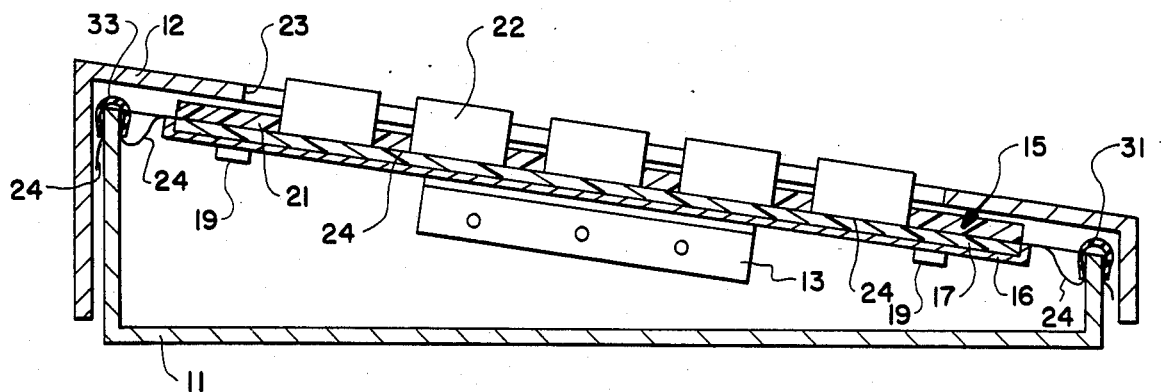
FIG. 2 is a transverse sectional view of the assembled keyboard through a vertical row of keys.
Figure 3:
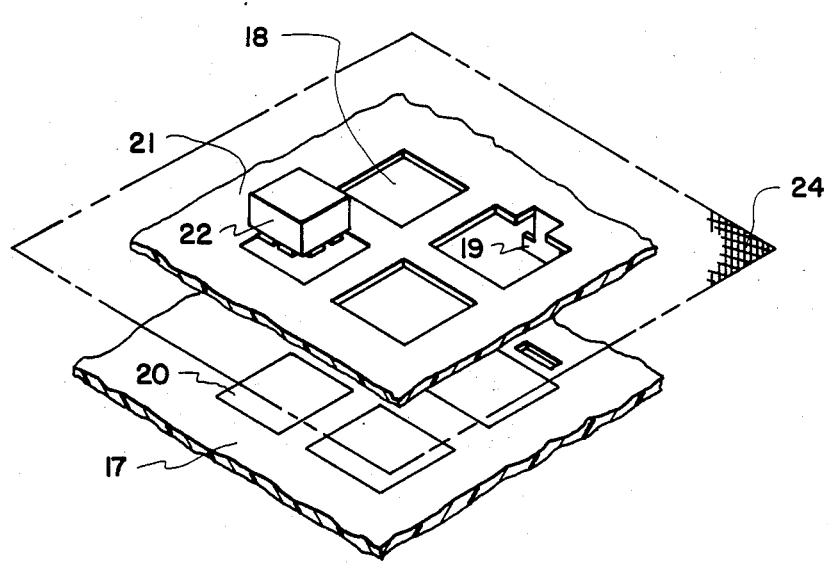
FIG. 3 shows details.

A shielded keyboard enclosure according to the invention is shown in FIG. 1 to comprise a housing of shielding metal having a base 11 and a cover 12. Base 11 includes a pair of brackets 13 and 14 to which is bolted a keying assembly 15 including a rigid tray 16 containing a plate 17 of membrane keyboard contacts suggested at 20, which is apposed to a plate 21 of shielding metal having apertures 18 to mount push button actuators suggested at 22, and secured to plate 17 by tabs 19 as suggested in FIG. 3. The structure and assembly of members 16-22 is well known in the art. Cover 12 is provided with cutouts as at 23 to afford access to the actuators 22.

According to the present invention, an electrical shielding member 24 of flexible fine wire mesh of Monel metal or stainless steel is interposed in assembly 15 between plates 17 and 21. It extends beyond them in all directions, and is penetrated by tabs 19 which then pass through narrow openings in plate 17 and are twisted to retain them.

Member 24 is retained in electrical contact with base 11 by a set of wear strips 30, 31, 32, and 33 which are resilient and U-shaped in cross section, and which grip material 24 to the upstanding ridge comprising the walls of base 11 around the entire periphery, holding the sheet of material smoothly between members 17 and 21 so that pressure on any actuator 22 may be transmitted through the mesh to cause closure of the contacts 20 apposed thereto. On release of the actuator, the normal slight elasticity in member 24 enables the contacts 20 to open.

The arrangement has the advantage over a simple apertured metallic panel that there are no cracks or interstices around the actuators through which radiation can pass. It is advantageous over a similarly located foil, first that it provides an extreme amount of flexibility around the periphery of the unit, which could not be realized with a sheet of foil, for example, and second that it does not affect a human engineering aspect of the device, its "feel", which could not be realized with foil.

While the invention has been shown in a membrane keyboard embodiment, it will be evident that it could be applied generally in many types of keyboard structures.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. A keyboard and means for preventing electromagnetic emissions from being radiated from said keyboard, said means including:
    a. a housing of electrically conductive and magnetically permeable material;
    b. an array of discrete electric current switch means mounted in said housing, said switch means being characterized by producing electromagnetic waves upon electric current flowing therethrough;
    c. an array of discrete switch actuators mounted respetively in apposition with said switch means; and
    d. an electromagnetic wave shielding sheet of flexible electrically conductive magnetically permeable fine wire mesh material, said shielding sheet being electrically connected to said housing and interposed between said switch means and said actuators, whereby said shielding sheet in combination with said housing functions to prevent electromagnetic waves from said switch means, as aforesaid, being radiated through said shielding sheet and through said housing.

* * * * *